UNITED STATES PATENT OFFICE.

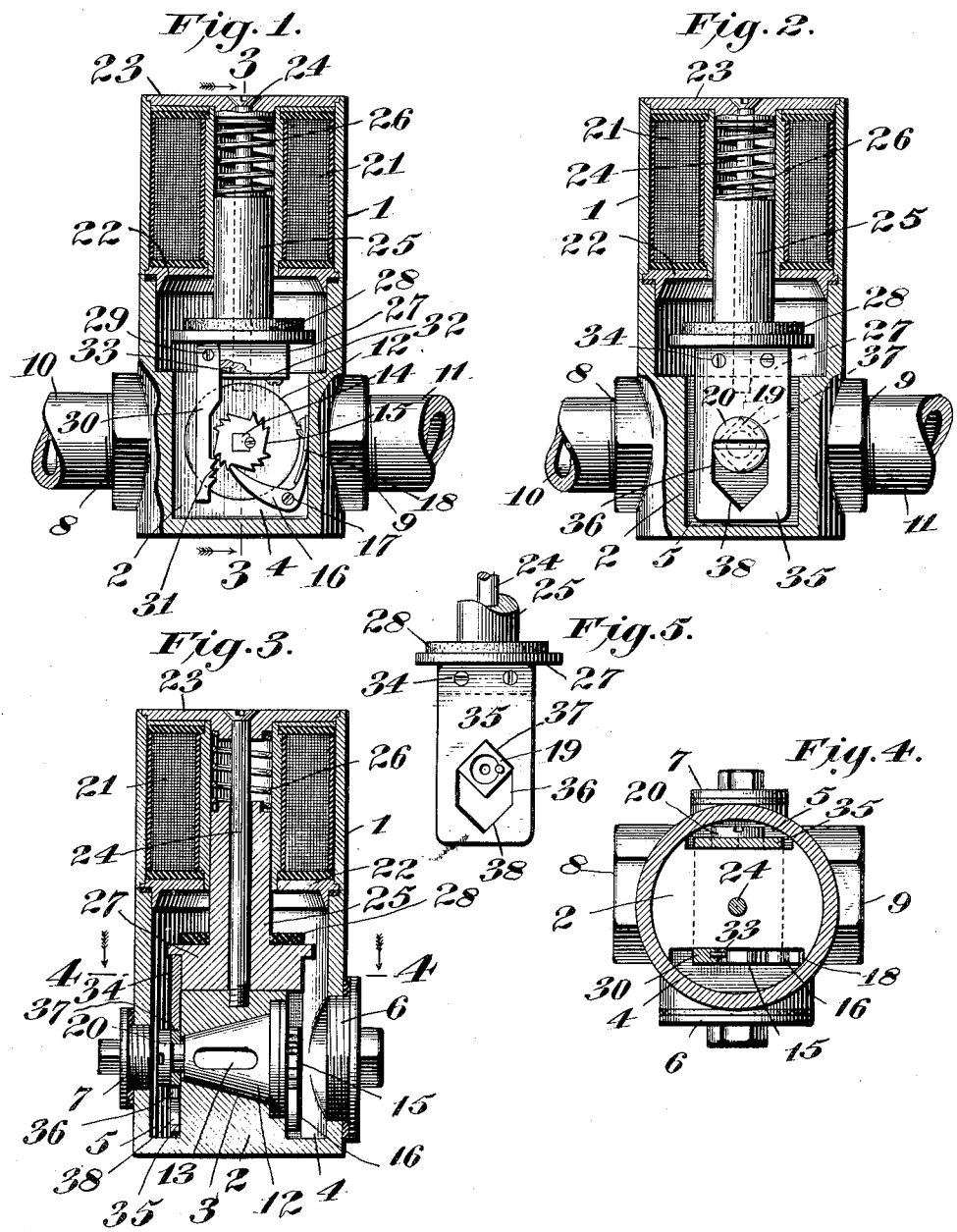

ISAAC G. WATERMAN, OF SANTA BARBARA, CALIFORNIA.

ELECTROMAGNETIC VALVE.

No. 802,956.     Specification of Letters Patent.     Patented Oct. 24, 1905.

Application filed January 12, 1904. Serial No. 188,787.

*To all whom it may concern:*

Be it known that I, ISAAC G. WATERMAN, a citizen of the United States, residing at Santa Barbara, in the county of Santa Barbara and State of California, have invented new and useful Improvements in Electromagnetic Valves, of which the following is a specification.

This invention relates to electromagnetic valves.

The present invention is an improvement on the electromagnetic valve set forth in my copending application, Serial No. 164,888, filed July 9, 1903, and has for its object the provision of improved means for guiding the armature and improved means adapted to insure turning of the rotary valve the exact amount to completely open or completely close the valve.

The invention also embraces the use of a novel arrangement of movable closures in the valve-casing to facilitate access to the valve, such closures being claimed in an other application for a mechanical push-button valve executed of even date herewith.

The present invention relates to that type of my series of electromagnetic valve inventions on which applications for patent have previously been made embracing solenoid, an armature spring-pressed in one direction, a rotary valve, and pawl and ratchet-wheel mechanism for operating the valve from the armature, alternate electrical energizations of the solenoid opening and closing the valve.

The features constituting the subject-matter of the present invention as used in connection with a valve of the type set forth are set forth fully hereinafter, and the novel features recited in the appended claims.

In this application I do not claim, broadly, the automatic rectifying of the position of the valve, as broad claims for such invention are made in my application Serial No. 188,786, filed January 12, 1904.

In the accompanying drawings, Figure 1 is a vertical section; Fig. 2, a similar view on the opposite side of the device; Fig. 3, a vertical section on line 3 3 of Fig. 1; Fig. 4, a cross-section on line 4 4 of Fig. 3, and Fig. 5 a detail showing the association of the valve-setting plate and the polygonal member carried with the valve.

The cylindrical magnetizable shell or casing 1 has a solid integral block 2 in its lower part, which is provided with a tapered conical valve-seat 3 and is separated from the sides of the shell 1 by spaces 4 and 5.

Screwed into opposite sides of the shell 1 are the suitably-packed large and small plugs or closures 6 and 7, alined with the ends of the valve-seat and closing openings through which the valve can be adjusted, removed, or inspected, as desired. These closures are claimed in an application for a mechanical push-button valve which I have executed of even date herewith.

The block 2 has ports 8 and 9, to which the sections 10 and 11 of the pipe lead.

The rotary conical or tapered valve 12 has a single port 13 and properly fits the seat 3 to turn therein. Secured on the squared valve-stem 14 is a ratchet-wheel 15, whose teeth are arranged in sets of three each, backward rotation of the valve being prevented by a dog 16, pivoted to the block 2 at 17 and pressed by a spring 18. Keyed to the other end of the valve to turn therewith is a squared nut or member 19, and 20 is a screw, which is threaded into the same end of the valve and whose head bears on the nut 19.

In the upper portion of the shell 1 is secured a solenoid 21, which rests on a partition 22 in the shell. The top 23 of shell 1 is removable and is held in position by a screw-rod 24, screwed at its lower end into block 2, said rod extending centrally of the opening in the solenoid.

The armature 25 works in the opening in the solenoid and is pressed down by a spring 26 and guided by the screw-rod 24, which passes loosely through said armature. On the lower end of the armature is a head 27, having a buffer 28 of some suitable sound-deadening material to prevent noise when the armature is attracted by the solenoid. When the armature is in normal position, the head 27 rests on block 2.

Pivoted at 29 to the head 27 is a pawl 30, having three teeth 31, adapted to engage the sets of teeth on ratchet-wheel 15, said pawl being pressed into engagement with the teeth by a spring 32 on the head 27, which bears on a lug 33 on the pawl. The pawl slides against one side of the block 2 and assists in preventing turning of the armature.

Secured to the opposite side of the head 27 at 34 is a valve-setting plate 35, which slides against the side of the block 2 opposite from the pawl 30, said plate having an opening 36, provided at its ends with V-shaped notches 37 and 38, adapted to fit the corners and sides of the nut 19 when the armature is at the limits of its movement, and thus bring the valve to exact on or exact off position. In other words, these V-shaped notches insure the proper positioning of the valve, so that its port 13 will either exactly aline with the ports 8 and 9 when the valve is open, or said port 13 will be positioned exactly at right angles to the ports 8 and 9 when the valve is closed. When the armature is attracted by the solenoid, the pawl 30 engages a set of teeth 15 and turns the valve a quarter-revolution, and the lower notch 38 insures a correct positioning of the valve, whether it is thus turned to open or closed position. When the solenoid is deënergized, the return of the parts by the spring 26 to the position shown in the drawings causes the notch 37 to engage the nut 19, and if the valve has not been previously correctly positioned—as, for instance, should the energization of the solenoid be so momentary that the armature was not pulled to its limit—the notch 37 will properly position the valve.

The head of the screw 20 is of greater diameter than the width of the opening 36, and the plate 35 is thus kept against the side of block 2.

The valve turns an exact quarter-revolution on each energization of the solenoid.

When the solenoid is energized, the pawl positively engages and turns the ratchet-wheel; but when the solenoid is deënergized and the armature is returned by its spring the pawl rides idly on the ratchet-wheel, which is prevented from turning backward by the dog 16.

Any suitable type of electroswitch can be used to control the current to the solenoid; but the use of any of the temporary contact-switches set forth in a series of applications previously filed by me are preferable in this connection, as they send only a momentary current, which is all that the solenoid requires to operate the valve. Succeeding electrical energizations of the solenoid open and close the valve in alternation.

Having thus described my invention, what I claim as new, and desire to secure by Letters Patent, is—

1. In a valve, the combination with a valve-casing, of a rotary valve fitted to turn in a seat in said valve-casing, a polygonal member operated by the valve, a valve-operating member having means for turning the valve, and a plate movable by the valve-operating member aforesaid and having a notch adapted to engage a corner of the polygonal member aforesaid when the valve-operating member is actuated, said notch and polygonal member insuring proper positioning of the valve.

2. In a valve, the combination with a valve-casing, of a rotary valve fitted to turn in a seat in said valve-casing, a polygonal member operated by the valve, a valve-operating member having means for turning the valve, and a plate movable by the valve-operating member aforesaid and having two opposing notches, respectively adapted to engage the corners of the polygonal member on the forward and return movements of the valve-operating member to insure proper positioning of the valve.

3. In a valve, the combination with a valve-casing, of a rotary valve fitted to turn in a seat in said valve-casing, a valve-operating member, a plate carried with the valve-operating member and slidable against the side of the valve-casing to guide the valve-operating member, and a pawl for operating the valve which is carried by the valve-operating member and slidable against the other side of the valve-casing.

4. In a valve, the combination with a valve-casing, of a rotary valve fitted to turn in a seat in said valve-casing, a square member operated by the valve, a valve-operating member, means for turning the valve a quarter-turn from said valve-operating member, and a plate operated by the valve-operating member which has opposing V-shaped notches, respectively adapted to engage the corners of the square member on the forward and return movements of the valve-operating member to insure proper positioning of the valve.

In testimony whereof I have signed my name to this specification in the presence of two subscribing witnesses.

ISAAC G. WATERMAN.

Witnesses:
ELMER SEAVEY,
WALLACE R. SEAVEY.